U S008264970B2

(12) United States Patent
Mohan et al.

(10) Patent No.: US 8,264,970 B2
(45) Date of Patent: Sep. 11, 2012

(54) CONTINUITY CHECK MANAGEMENT IN A LINK STATE CONTROLLED ETHERNET NETWORK

(75) Inventors: Dinesh Mohan, Kanata (CA); Paul Unbehagen, Apex, NC (US); Srikanth Keesara, Tewksbury, MA (US)

(73) Assignee: Rockstar Bidco, LP, New York, NY (US)

( * ) Notice: Subject to any disclaimer, the term of this patent is extended or adjusted under 35 U.S.C. 154(b) by 166 days.

(21) Appl. No.: 12/249,946

(22) Filed: Oct. 12, 2008

(65) Prior Publication Data
US 2009/0232006 A1 Sep. 17, 2009

Related U.S. Application Data

(60) Provisional application No. 60/979,438, filed on Oct. 12, 2007.

(51) Int. Cl.
*H04L 12/26* (2006.01)
*H04L 12/28* (2006.01)
(52) U.S. Cl. ............... 370/241.1; 370/255; 370/252
(58) Field of Classification Search .......... 370/252, 370/248, 249, 241, 241.1, 236.2, 312, 432, 370/254, 255, 401; 709/220, 223–224
See application file for complete search history.

(56) References Cited

U.S. PATENT DOCUMENTS

| 5,737,319 | A  | * | 4/1998  | Croslin et al. ............. 370/255 |
| 5,867,396 | A  | * | 2/1999  | Parlour .................... 716/104 |
| 6,438,563 | B1 | * | 8/2002  | Kawagoe ................... 1/1 |
| 7,058,024 | B1 | * | 6/2006  | Koay ....................... 370/255 |
| 7,697,419 | B1 | * | 4/2010  | Donthi ..................... 370/220 |
| 7,701,936 | B2 | * | 4/2010  | Hongal et al. .............. 370/390 |
| 7,742,432 | B2 | * | 6/2010  | Dominick et al. ........... 370/254 |
| 7,842,259 | B2 | * | 11/2010 | Glover ..................... 422/220 |
| 7,990,855 | B2 | * | 8/2011  | Bi et al. .................. 370/229 |
| 8,010,643 | B2 | * | 8/2011  | Gray et al. ................ 709/223 |
| 8,125,560 | B1 | * | 2/2012  | Huang et al. ............... 348/349 |
| 2004/0223463 | A1 | * | 11/2004 | MacKiewich et al. ....... 370/256 |
| 2005/0099954 | A1 |   | 5/2005  | Mohan et al. |
| 2005/0249124 | A1 | * | 11/2005 | Elie-Dit-Cosaque et al. 370/242 |
| 2006/0050634 | A1 | * | 3/2006  | Gous ....................... 370/229 |

(Continued)

OTHER PUBLICATIONS

Non-Final Office Action dated Apr. 5, 2010 for U.S. Appl. No. 12/249,941.

(Continued)

*Primary Examiner* — Kwang B Yao
*Assistant Examiner* — Candal Elpenord
(74) *Attorney, Agent, or Firm* — Guerin & Rodriguez, LLP

(57) ABSTRACT

An OAM link trace message is sent from a source node to a target node in a link state protocol controlled Ethernet network. The link trace message using an 802.1ag format except, as a destination address, it uses either the unicast Ethernet MAC node ID of the target node, or the multicast destination address of the service instance. A method of network topology verification in a link state protocol controlled Ethernet network checks the link state protocol database at a node to ascertain the control plane topology view of at least part of the network. It then executes one or more Ethernet OAM commands from the node to ascertain the data plane topology view of the same part of the network. The control plane topology view of the network is compared to the data plane topology view of the network to see if they match. An error is flagged if they do not match.

6 Claims, 13 Drawing Sheets

U.S. PATENT DOCUMENTS

| | | |
|---|---|---|
| 2006/0153220 A1 | 7/2006 | Elie-Dit-Cosaque et al. |
| 2006/0285529 A1 | 12/2006 | Hares et al. |
| 2007/0014290 A1 | 1/2007 | Dec et al. |
| 2007/0025256 A1 | 2/2007 | Hertoghs et al. |
| 2007/0086361 A1 | 4/2007 | Allan et al. |
| 2007/0223493 A1* | 9/2007 | Sridhar et al. ........... 370/395.53 |
| 2007/0237156 A1 | 10/2007 | Wang |
| 2008/0279105 A1* | 11/2008 | Absillis et al. ............. 370/236.2 |
| 2009/0168666 A1 | 7/2009 | Unbehagen et al. |
| 2009/0279536 A1 | 11/2009 | Unbehagen et al. |

OTHER PUBLICATIONS

International Search Report for PCT/US2008/079825 dated Jan. 27, 2009; 3 pages.

"Carrier Ethernet" [online]; IXIACOM; Sep. 25, 2007; [retrieved on Dec. 22, 2008]; retrieved from the Internet: <URL: http://www.ixiacom.com/pdfs/library/white_papers/carrier_ethernet.pdf>; 11 pages.

* cited by examiner

CONTINUITY CHECK MANAGEMENT IN A LINK STATE CONTROLLED ETHERNET NETWORK

CROSS-REFERENCE TO RELATED APPLICATIONS

This application claims priority to the U.S. Provisional Patent Application Ser. No. 60/979,438, filed Oct. 12, 2007, which is entitled PLSB AND IP SHORTCUTS OAM, the content of which is hereby incorporated herein by reference.

This application is related to co-pending U.S. patent application Ser. No. 12/249,941, filed Oct. 12, 2008, which is entitled IP NETWORK AND PERFORMANCE MONITORING USING ETHERNET OAM and U.S. patent application Ser. No. 12/249,994, filed Oct. 12, 2008, which is entitled AUTOMATIC MEP PROVISIONING IN A LINK STATE CONTROLLED ETHERNET NETWORK, both co-owned by Nortel Networks Limited, filed on the same date herewith, and also to co-pending U.S. patent application Ser. No. 12/151,684, filed May 5, 2008, which is entitled IP FORWARDING ACROSS A LINK STATE PROTOCOL CONTROLLED ETHERNET NETWORK, also co-owned by Nortel Networks Limited.

TECHNICAL FIELD

The present invention relates to link state protocol controlled Ethernet networks, and, more particularly, Operations, Administration, and Maintenance (OAM) in a link state protocol controlled Ethernet network.

BACKGROUND

Data communication networks may include various computers, servers, nodes, routers, switches, bridges, hubs, proxies, and other network devices coupled to and configured to pass data to one another. These devices will be referred to herein as "network elements." Data is communicated through the data communication network by passing protocol data units, such as Internet Protocol packets, Ethernet Frames, data cells, segments, or other logical associations of bits/bytes of data, between the network elements by utilizing one or more communication links between the network elements. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how protocol data units should be handled or routed through the network by the network elements, and how information such as routing information should be exchanged between the network elements.

Ethernet is a well known networking protocol that has been defined by the Institute of Electrical and Electronics Engineers (IEEE) as standard 802.1 in Ethernet network architectures, devices connected to the network compete for the ability to use shared telecommunications paths at any given time. Where multiple bridges or nodes are used to interconnect network segments, multiple potential paths to the same destination often exist. The benefit of this architecture is that it provides path redundancy between bridges and permits capacity to be added to the network in the form of additional links. However to prevent loops from being formed, a spanning tree was generally used to restrict the manner in which traffic was broadcast or flooded on the network. A characteristic of a spanning tree is that there is only one path between any pair of destinations in the network, and therefore it was possible to "learn" the connectivity associated with a given spanning tree by watching where packets came from. However the spanning tree itself was restrictive and often led to over-utilization of the links that were on the spanning tree and non-utilization of the links that weren't part of the spanning tree.

To overcome some of the limitations inherent in Ethernet networks implementing a spanning tree, a link state protocol controlled Ethernet network was disclosed in application Ser. No. 11/537,775, filed Oct. 2, 2006, entitled "Provider Link State Bridging," the content of which is hereby incorporated herein by reference. As described in greater detail in that application, rather than utilizing a learned network view at each node by using the Spanning Tree Protocol (STP) algorithm combined with transparent bridging, in a link state protocol controlled Ethernet network the bridges forming the mesh network exchange link state advertisements to enable each node to have a synchronized view of the network topology. This is achieved via the well understood mechanism of a link state routing system. The bridges in the network have a synchronized view of the network topology, have knowledge of the requisite unicast and multicast connectivity, can compute shortest path connectivity between any pair of bridges in the network, and can individually populate their forwarding information bases (FIBs) according to the computed view of the network.

When all nodes have computed their role in the synchronized view and populated their FIBs, the network will have a loop-free unicast tree to any given bridge from the set of peer bridges (those that require communication to that bridge for whatever reason); and a both congruent and loop-free point-to-multipoint (p2mp) multicast tree from any given bridge to the same set or subset of peer bridges per service instance hosted at the bridge. The result is the path between a given bridge pair is not constrained to transiting the root bridge of a spanning tree and the overall result can better utilize the breadth of connectivity of a mesh. In essence every bridge roots one or more trees which define unicast connectivity to that bridge, and multicast connectivity from that bridge.

When customer traffic enters a provider network, the customer MAC address (C-MAC DA) is resolved to a provider MAC address (B-MAC DA), so that the provider may forward traffic on the provider network using the provider MAC address space. Additionally, the network elements on the provider network are configured to forward traffic based on Virtual LAN ID (VID) so that different frames addressed to the same destination address but having different VIDs may be forwarded over different paths through the network. In operation, a link state protocol controlled Ethernet network may associate one VID range with shortest path forwarding, such that unicast and multicast traffic may be forwarded using a VID from that range, and traffic engineering paths may be created across the network on paths other than the shortest path, and forwarded using a second VID range.

In order to add true carrier class features to link state protocol controlled Ethernet, certain Operations, Administration, and Management (OAM) features are desirable. Ethernet OAM as currently defined in IEEE standard 802.1ag "Connectivity Fault Management", defines a set of connectivity fault management protocols for use in Ethernet networks. These include: continuity check, link trace, and loopback protocols. The 802.1ag standard has been extended to include performance monitoring metrics and messages. This standard is reflected at ITU-T SG 13, Y.1731—"Requirements for OAM in Ethernet Networks". But the mechanisms described in these standards are not directly applicable to link state protocol Ethernet networks because of some differences in addressing and VLAN semantics and usage between the standards and the link state protocol Ethernet networks. It is desirable to incorporate OAM features for fault identification, isolation, troubleshooting, and performance monitoring purposes into link state protocol Ethernet networks.

SUMMARY OF THE INVENTION

In accordance with the invention, there is provided a method of sending an OAM message in a link state protocol controlled Ethernet network. The method includes the steps of sending an OAM link trace message from a source node to a target node in the link state protocol controlled Ethernet network, the link trace message using an 802.1ag format except, as a destination address, using the unicast Ethernet MAC node ID of the target node.

In accordance with another aspect of the invention, another method of sending an OAM message in a link state protocol controlled Ethernet network includes the steps of sending an OAM link trace message from a source node in the link state protocol controlled Ethernet network in order to trace a service instance, the link trace message using an 802.1ag format except, as a destination address, using a multicast destination address of the service instance.

According to a third aspect of the invention, a method of network topology verification in a link state protocol controlled Ethernet network includes the steps of checking the link state protocol database at a node to ascertain the control plane topology view of at least part of the network; executing one or more Ethernet OAM commands from the node to ascertain the data plane topology view of the same part of the network; comparing the control plane topology view of the network to the data plane topology view of the network to see if they match; and flagging an error if they do not match.

The step of checking the link state protocol database can include the steps of tracing all paths through the network from a first node in the link state protocol controlled Ethernet network, and the step of executing one or more Ethernet OAM commands can include the step of executing one or more link trace Ethernet OAM link trace commands from the first node in order to trace a service instance, the link trace commands using an 802.1ag format except, as a destination address, using a multicast destination address of the service instance.

Or, the step of checking the link state protocol database can include steps of tracing a path through the network from a first node to a second node in the link state protocol controlled Ethernet network, and the step of executing one or more Ethernet OAM commands can include the step of executing one or more link trace Ethernet OAM link trace commands from the first node in order to trace a service path, the link trace commands using an 802.1ag format except, as a destination address, using a unicast destination address of the Ethernet MAC node ID.

In accordance with another aspect of the invention, there is presented a program product including a computer readable medium having embodied therein a computer program for storing data, the computer program comprising logic for sending an OAM message in a link state protocol controlled Ethernet network. The logic includes: logic for sending an OAM link trace message from a source node to a target node in the link state protocol controlled Ethernet network, the link trace message using an 802.1ag format except, as a destination address, using the unicast Ethernet MAC node ID of the target node.

In accordance with a further aspect of the invention, there is presented a program product including a computer readable medium having embodied therein a computer program for storing data, the computer program comprising logic for sending an OAM link trace message from a source node in the link state protocol controlled Ethernet network in order to trace a service instance, the link trace message using an 802.1ag format except, as a destination address, using a multicast destination address of the service instance.

According to further aspects of the invention, a program product including a computer readable medium has embodied therein a computer program for storing data. The computer program performs network topology verification in a link state protocol controlled Ethernet network. The computer program includes: logic for checking the link state protocol database at a node to ascertain the control plane topology view of at least part of the network; logic for executing one or more Ethernet OAM commands from the node to ascertain the data plane topology view of the same part of the network; logic for comparing the control plane topology view of the network to the data plane topology view of the network to see if they match; and logic for flagging an error if they do not match.

In accordance with one embodiment, the logic for checking the link state protocol database includes logic for tracing all paths through the network from a first node in the link state protocol controlled Ethernet network, and the logic for executing one or more Ethernet OAM commands includes logic for executing one or more link trace Ethernet OAM link trace commands from the first node in order to trace a service instance, the link trace commands using an 802.1ag format except, as a destination address, using a multicast destination address of the service instance.

In accordance with another embodiment, the logic for checking the link state protocol database includes logic for tracing a path through the network from a first node to a second node in the link state protocol controlled Ethernet network, and the logic for executing one or more Ethernet OAM commands comprises logic for executing one or more link trace Ethernet OAM link trace commands from the first node in order to trace a service path, the link trace commands using an 802.1ag format except, as a destination address, using a unicast destination address of the Ethernet MAC node ID.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

Link state protocol controlled Ethernet networks provide the equivalent of Ethernet bridged connectivity, but achieve this via configuration of the network element forwarding information bases (FIBs) rather than by flooding and learning. Using a link state protocol to control an Ethernet network enables the Ethernet network to be scaled from the LAN space to the WAN or provider network space by providing more efficient use of network capacity with loop-free shortest path forwarding. Rather than utilizing a learned network view at each node by using the Spanning Tree Protocol (STP) algorithm combined with transparent bridging, in a link state protocol controlled Ethernet network the bridges forming the mesh network exchange link state advertisements to enable each node to have a synchronized view of the network topology. This is achieved via the use of a link state routing system. The bridges in the network have a synchronized view of the network topology, have knowledge of the requisite unicast and multicast connectivity, can compute shortest path connectivity between any pair of bridges in the network, and individually can populate their forwarding information bases (FIBs) according to the computed view of the network. When all nodes have computed their role in the synchronized view and populated their FIBs, the network will have a loop-free unicast tree to any given bridge from the set of peer bridges; and a both congruent and loop-free point-to-multipoint (p2mp) multicast tree from any given bridge to the same set of peer bridges. The result is the path between a given bridge pair is not constrained to transiting the root bridge of a spanning tree and the overall result can better utilize the breadth of connectivity of a mesh.

Link state protocol controlled Ethernet networks generally use symmetrical link metrics such that connectivity between any two bridges follows the same path in both directions, and uses common metrics for unicast and multicast connectivity such that there is congruency of forwarding between packets which are multicast and packets which are unicast.

MAC configuration may be used to construct shortest path loop-free connectivity (for both unicast and multicast purposes) between a set of (slightly modified) bridges in order to provide transparent LAN service to the C-MAC (Customer MAC) layer or other layer networks that can use a transparent LAN sendee. This requires the operation of a link state routing protocol within the network in lieu of the spanning tree protocol for the associated VLAN(s) and the piggybacking of MAC information on routing system advertisements.

Figure 1:
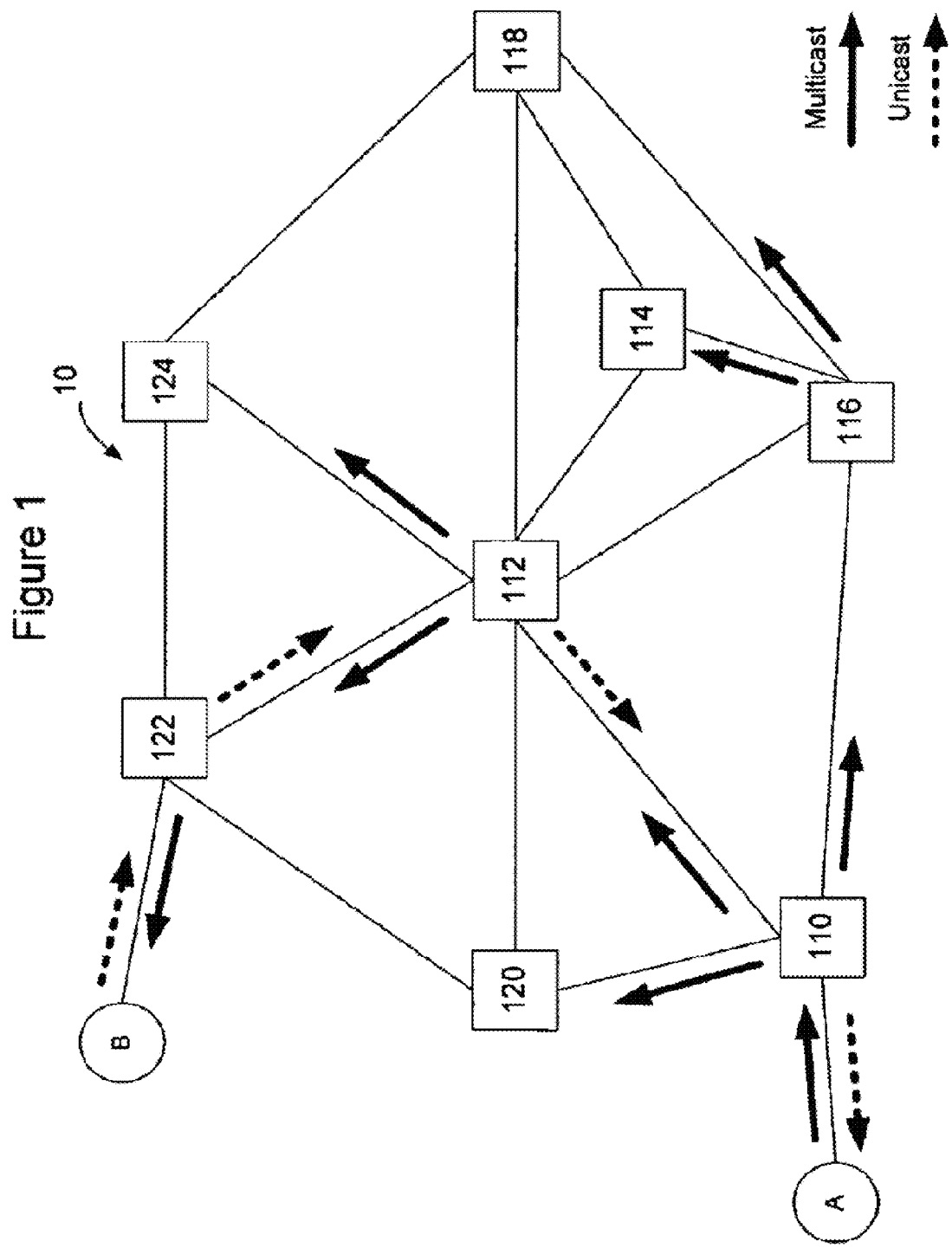
FIG. 1 is a functional block diagram of a mesh network that may be used to implement a link state protocol controlled Ethernet network.

FIG. 1 is a schematic representation of an example of a portion of a link state protocol controlled Ethernet network. From the shared network topology each node calculates optimal shortest paths to other provider backbone bridges (PBB) or nodes in the network using a shortest path algorithm. The outcome of the application of the shortest path algorithm across the network, and the corresponding population of the FIB in the bridges, provides a unique tree through the mesh from each bridge to the member bridges of the network.

The MAC addresses associated with a bridge (unicast and multicast) are global to the link state protocol controlled Ethernet network and are used for destination based forwarding. This means they can be simply flooded in routing system advertisements and, upon local convergence of the routing system, can be instantiated in the local bridge forwarding database (or FIB) as directed by the routing system. In this way distributed computation of layer 2 connectivity can be applied to Ethernet bridges without requiring a distinct signaling system to associate connectivity with topology. In its simplest form, when a bridge has computed that it is on the shortest path between two given bridge nodes, it simply installs the MAC addresses associated with those bridges in the FIB, the unicast MAC addresses pointing to each of the bridges of interest and the multicast MAC address(es) pointing from the bridges of interest.

It should be understood that although a single unicast MAC address per bridge has been described, nothing precludes the use of finer granularity, and a unicast MAC address may refer to a line card, a virtual switch instance (VSI) or UNI port. This may be desirable to simplify de-multiplexing of flows at a destination bridge.

Loop suppression is required in the network to maintain connectivity (albeit in a potentially degraded form) during periods of instability (the period between a topology change, advertisement of the topology change by the routing system to all bridges in the network, and re-convergence on a common view of the new topology and corresponding update of forwarding information). Instability in a distributed system frequently means that, at least temporarily, the overall view of the network will not be synchronized. Where the network elements do not have a synchronized view of the network it is possible for transitory loops to be formed. PLSB networks may use reverse path forwarding checks to minimize loops as described in greater detail in the parent application. RPFC checks may be performed by causing a network element such as an Ethernet bridge to check packets by comparing the Source MAC address contained in the packet and the segment on which the packet arrives, with the values that are configured for that same MAC address as a destination in the forwarding database. If the learned segment for the source MAC address would modify a static entry, or there is no static entry, then the packet is discarded. RPFC checks may optionally be disabled in particular instances as desired.

A link state protocol controlled Ethernet network can support service instances, where any service instance only requires connectivity to a subset of the ports and therefore bridges in the network. One example of an identifier that may be used to identify packets associated with a particular sendee instance is the extended sendee ID field (I-SID) defined in IEEE 802.1ah. A bridge that finds itself on the shortest path between two bridges installs the unicast MAC address(es) associated with each bridge, and the multicast MAC addresses for all I-SIDs common to the two bridges. The consequence of this is that a given edge bridge will have unicast connectivity to all peer bridges, and multicast connectivity unique to each I-SID identified community of interest. This will be in the form of being a leaf on a multi-to-point (mp2p) unicast tree to each peer, and being the root of an (S,G) point-to-multipoint (p2mp) multicast tree, where S is the address of the source and G is the multicast group address, to the set of peer nodes for each community of interest.

Further, as described in co-pending U.S. patent application Ser. No. 12/151,684, filed May 5, 2008, which is entitled IP FORWARDING ACROSS A LINK STATE PROTOCOL CONTROLLED ETHERNET NETWORK, herein incorporated by reference in its entirety, a link state protocol controlled Ethernet network can support native IP. Accordingly, when a node learns an IP address, it will insert the IP address into its link state advertisement to advertise reachability of the IP address to the other nodes on the network. Each node will add this IP address to its link state database. If a packet arrives at an ingress node, the ingress node will read the IP address, determine which node on the link state protocol controlled Ethernet network is aware of the IP address, and construct a MAC header to forward the packet to the correct node. The DA/VID of the MAC header is the nodal MAC of the node that advertised the IP address. Unicast and multicast IP forwarding may be implemented.

Figure 2:
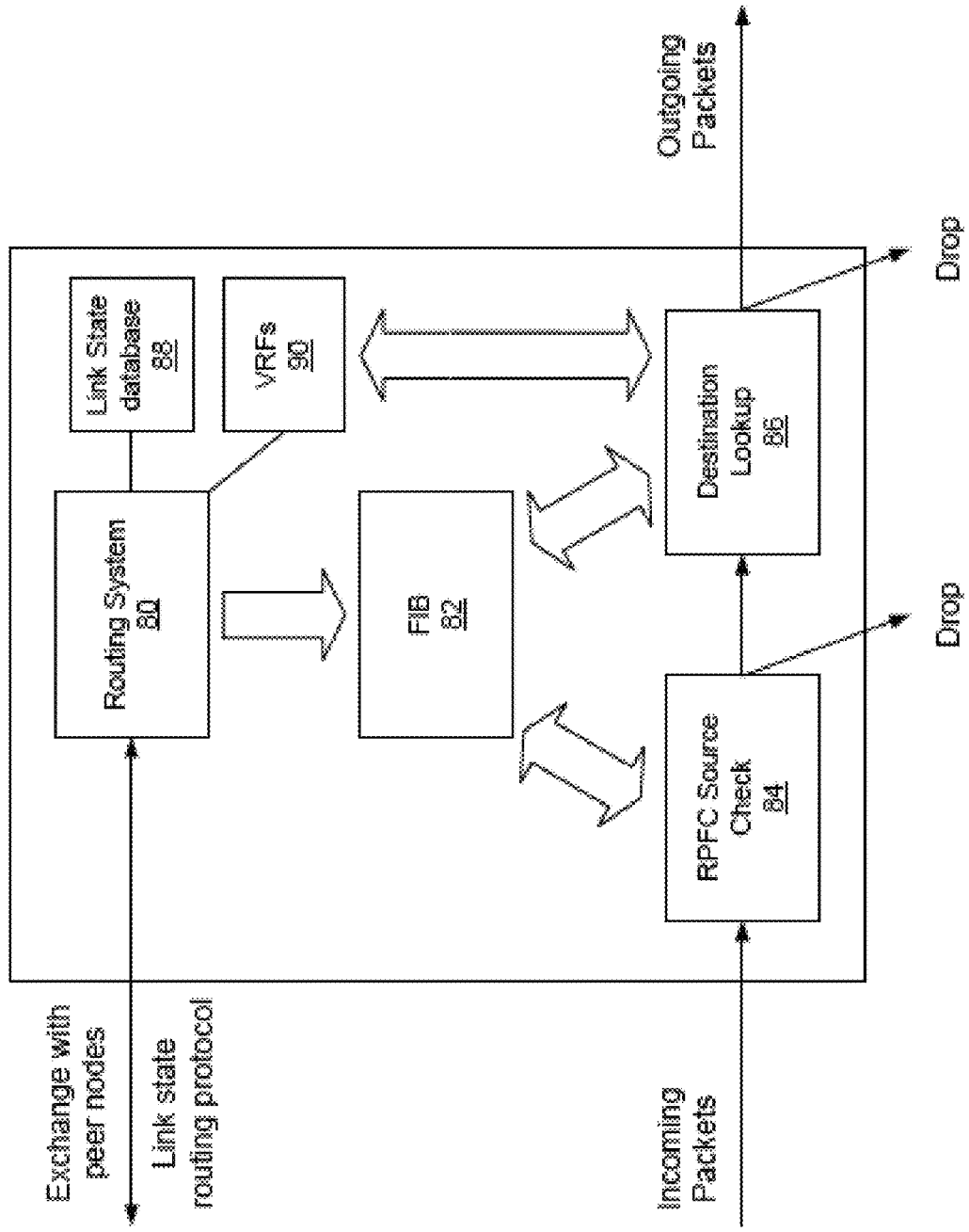
FIG. 2 is a schematic representation of one implementation of a network element 12 configured to be used in a link state protocol controlled Ethernet network.

FIG. 2 is a schematic representation of a possible implementation of a network element 12 configured to be used in a link state protocol controlled Ethernet network. The network element 12 includes a routing system module 80 configured to exchange control messages containing routing and other information with peers 12 in the network 10 regarding the network topology using a link state routing protocol. Information received by the routing system 80 may be stored in a link state database 90 or in another manner. As discussed previously, the exchange of information allows nodes on the network to generate a synchronized view of the network topology, which then allows the routing system module 80 to calculate the shortest paths to other nodes on the network. The shortest paths calculated by the routing system 80 will be programmed into a FIB 82, that is populated with the appropriate entries for directing traffic through the network based upon the calculated shortest paths, multicast trees, traffic engineered path entries, and based on other entries.

The routing system 80 may exchange route updates containing network layer reachability information. The network layer addresses known by nodes on the network will be stored in a link state database 90 on the network element 12 to allow ingress nodes to select the correct egress node on the link state protocol controlled Ethernet network when a network layer packet arrives. Knowledge of the network layer addressees may also allow multicast forwarding state to be implemented on the network to allow network layer multicast to be handled by the nodes on the network by causing the nodes to install forwarding state between pairs of nodes interested in the same IP multicast.

The network element 12 may also include one or more other modules such as a Reverse Path Forwarding Check (RPFC module 84 that may be used to process incoming frames and perform a lookup in the FIB 82 to determine if the port over which the frame was received coincides with the port identified in the FIB 82 for the particular Source MAC. Where the input port does not coincide with the correct port identified in the FIB, the RPFC module may cause the message to be dropped.

If the frame passes the RPFC 84 module, a destination lookup 86 module determines from the FIB 82 the port or ports over which the frame should be forwarded. If the FIB doesn't have an entry for the DA/VID, the frame is discarded.

It should also be understood that the modules described are for illustrative purposes only and may be implemented by combining or distributing functions among the modules of a node as would be understood by a person of skill in the art.

Figure 3:
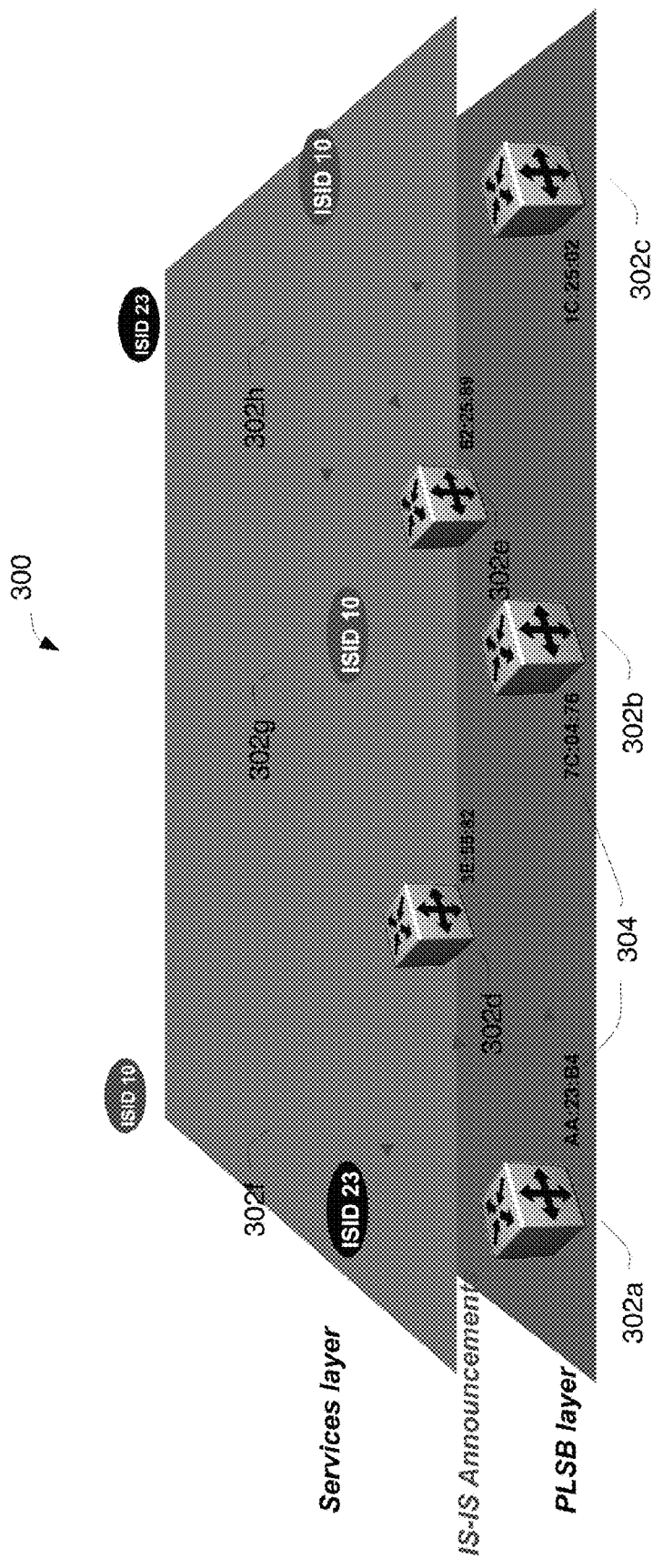
FIG. 3 is a schematic representation of a configured link state protocol controlled Ethernet network wherein a link state protocol such as IS-IS has executed its discovery phase to interconnect bridges in a loop-free configuration using each bridge's Sys-ID, and then and multicast connectivity creates an EVPN between all nodes that are members of an ISID.
Figure 4:
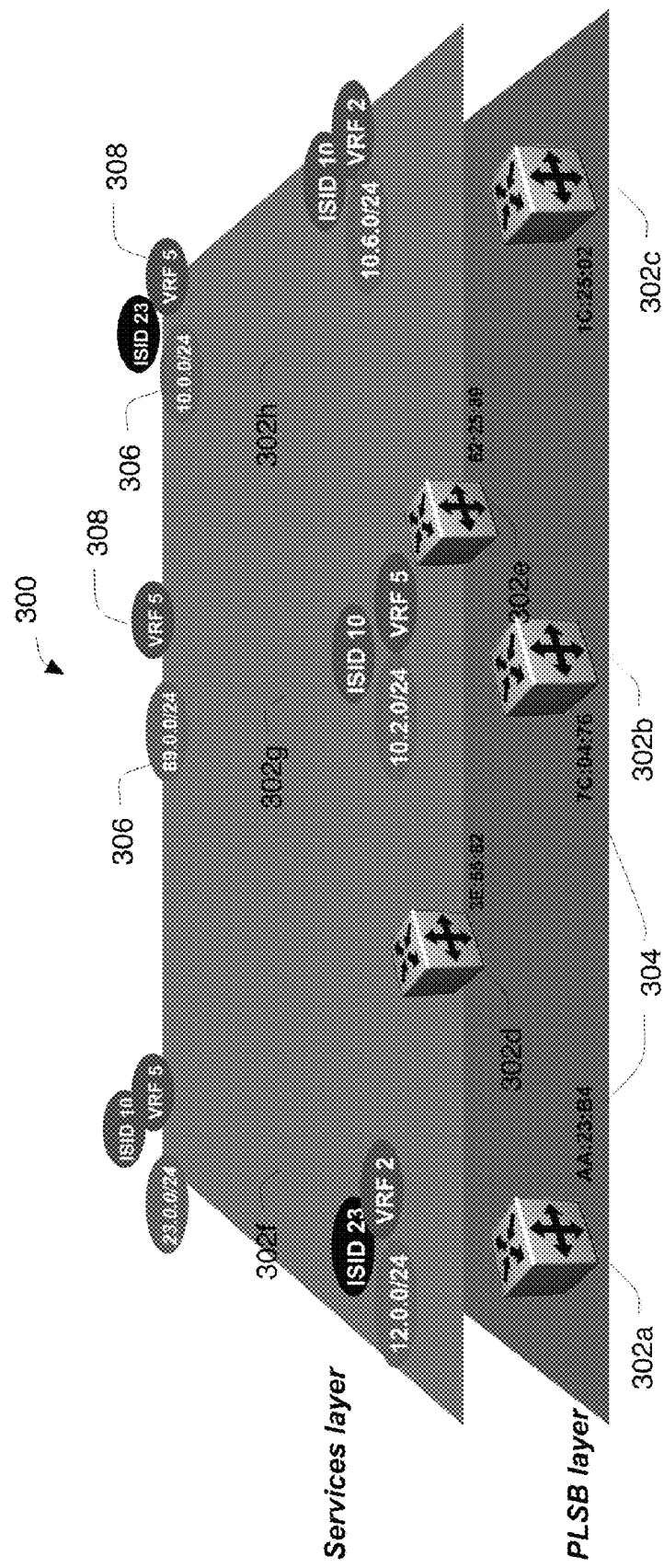
FIG. 4 is a schematic representation of a configured link state protocol controlled Ethernet network similar to FIG. 3 wherein multiple services are now shown mapped as leaves off the discovery phase trees.

Referring to FIG. 3, there is shown a link state protocol controlled Ethernet network 300 wherein a link state control protocol such as IS-IS has executed its discovery phase to interconnect bridges 302a-h in a loop-free configuration using each bridge's Sys-ID, aka nodal-MAC 304. Once an ISID is configured, for example ISID 23, an IS-IS update is sent out, and multicast connectivity creates the EVPN between all nodes that are members of ISID 23. A different set of IS-IS updates is sent out to create multicast connectivity for ISID 10. Once the ISIDs are created, all forwarding is then completed over the paths that were created using the Sys-IDs during link state discovery. Referring further to FIG. 4, every service is a leaf of this base topology. IP subnets 306 map directly to Sys-IDs, as described in co-pending U.S. patent application Ser. No. 12/151,684, filed May 5, 2008, which is entitled IP FORWARDING ACROSS A LINK STATE PROTOCOL CONTROLLED ETHERNET NETWORK, herein incorporated by reference in its entirety. VRFs 308 map via ISIDs, as described in co-pending U.S. patent application Ser. No. 12/215,350, filed Jun. 26, 2008, which is entitled IMPLEMENTATION OF VPNs OVER LINK STATE PROTOCOL CONTROLLED ETHERNET NETWORK, herein incorporated by reference in its entirety.

Ethernet OAM as currently defined in IEEE standard 802.1ag "Connectivity Fault Management", incorporated herein by reference, defines a set of connectivity fault management protocols for use in Ethernet networks. These include: continuity check, link trace, and loopback protocols. The 802.1ag standard has been extended to include performance monitoring metrics and messages. This standard is reflected at ITU-T SG 13, Y.1731—"Requirements for OAM in Ethernet Networks", also herein incorporated by reference. But the mechanisms described in these standards are not directly applicable to link state protocol Ethernet networks. In accordance with the invention, link state protocol Ethernet networks incorporate OAM features for fault identification, isolation, troubleshooting, and performance monitoring purposes.

The 802.1ag CFM messages include the following:

Continuity Check—These are "heartbeat" messages issued periodically by maintenance endpoints. They allow maintenance endpoints to detect loss of service connectivity amongst themselves.

Link Trace—These are transmitted by a maintenance endpoint on the request of the administrator to track the path (hop-by-hop) to a destination maintenance endpoint. They allow the transmitting node to discover connectivity data about the path. Link trace is similar in concept to UDP Traceroute.

Loopback—These are transmitted by a maintenance endpoint on the request of the administrator to verify connectivity to another maintenance point. Loopback indicates whether the destination is reachable or not; it does not allow hop-by-hop discovery of the path. It is similar in concept to ICMP Echo (Ping).

Maintenance Domains

Figure 5:
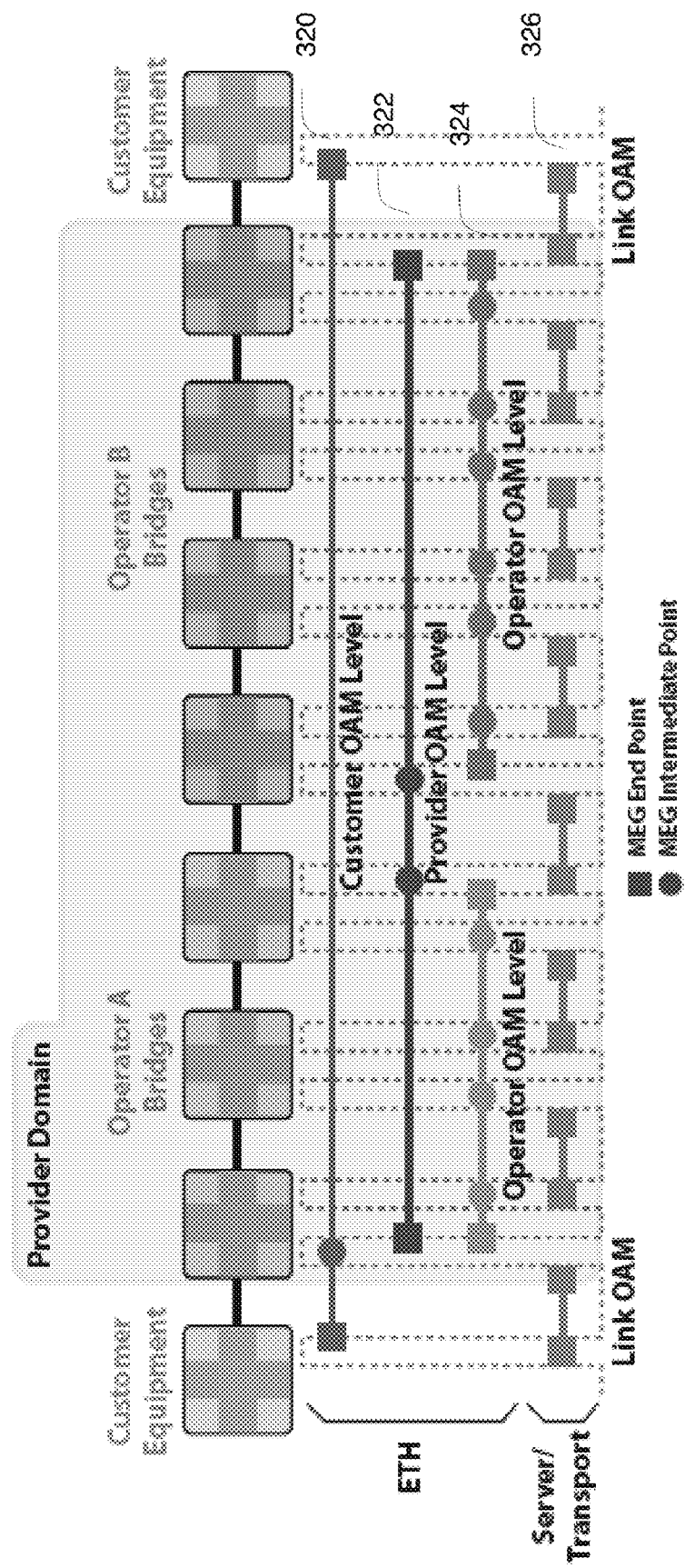
FIG. 5 is a block diagram of Ethernet OAM maintenance domains as defined by the 802.1ag standard.

Ethernet CFM, within any given service provider network, relies on a functional model consisting of hierarchical maintenance domains, as shown in FIG. 5. A domain is assigned a unique maintenance level (among eight possible) by the administrator, which is useful for defining the hierarchical relationship of domains. If two domains nest, the outer domain must have a higher maintenance level than the inner domain. Shown in FIG. 5 is a customer domain 402 encompassing a provider domain 404, encompassing 2 operator domains 406. Maintenance endpoints (squares) reside at the edge of a maintenance domain, whereas maintenance intermediate points (circles) are internal to the domain. Hence, an intermediate point will forward CFM packets (unless it is a loopback or link trace destined for that intermediate point), while endpoints do not forward CFM packets because they must keep them within the domain. The only exception to this is when an endpoint is also acting as an intermediate point for a higher-level domain, in which case it will forward CFM packets as long as they are part of the higher-level domain.

FIG. 5 shows an example where a service provider is using the networks of two operators to provide service. The service provider maintenance level is shown lt 322. The maintenance levels for Operator A and Operator B are shown at 324. Two special-case maintenance levels are the customer level (320) and the physical layer level (326). The customer level allows the customer to test connectivity (using connectivity checks) and isolate issues (using loopback and link trace). The physical layer level, on the other hand, defines the narrowest possible maintenance domain: a single link domain.

In accordance with first aspects of the invention, modifications are made to Ethernet OAM standards in order to adjust for differences between classical spanning tree based Ethernet and link state protocol controlled Ethernet. In accordance with second aspects of the invention, novel service level OAM features take advantage of link state protocol controlled Ethernet. In accordance with third aspects of the invention, Ethernet OAM is used by IP services over link state protocol controlled Ethernet networks for performance monitoring and control.

Infrastructure OAM

In accordance with the invention, link state protocol controlled Ethernet can implement CFM messages at the infrastructure level, prior to the setup of the first I-SID. Thus CFM messages are utilized by the link layer in FIGS. 3 and 4, and at the link OAM level in FIG. 5. At this point, diagnostic OAM can be helpful to test connectivity between nodes, before deploying services among them.

Figure 6:
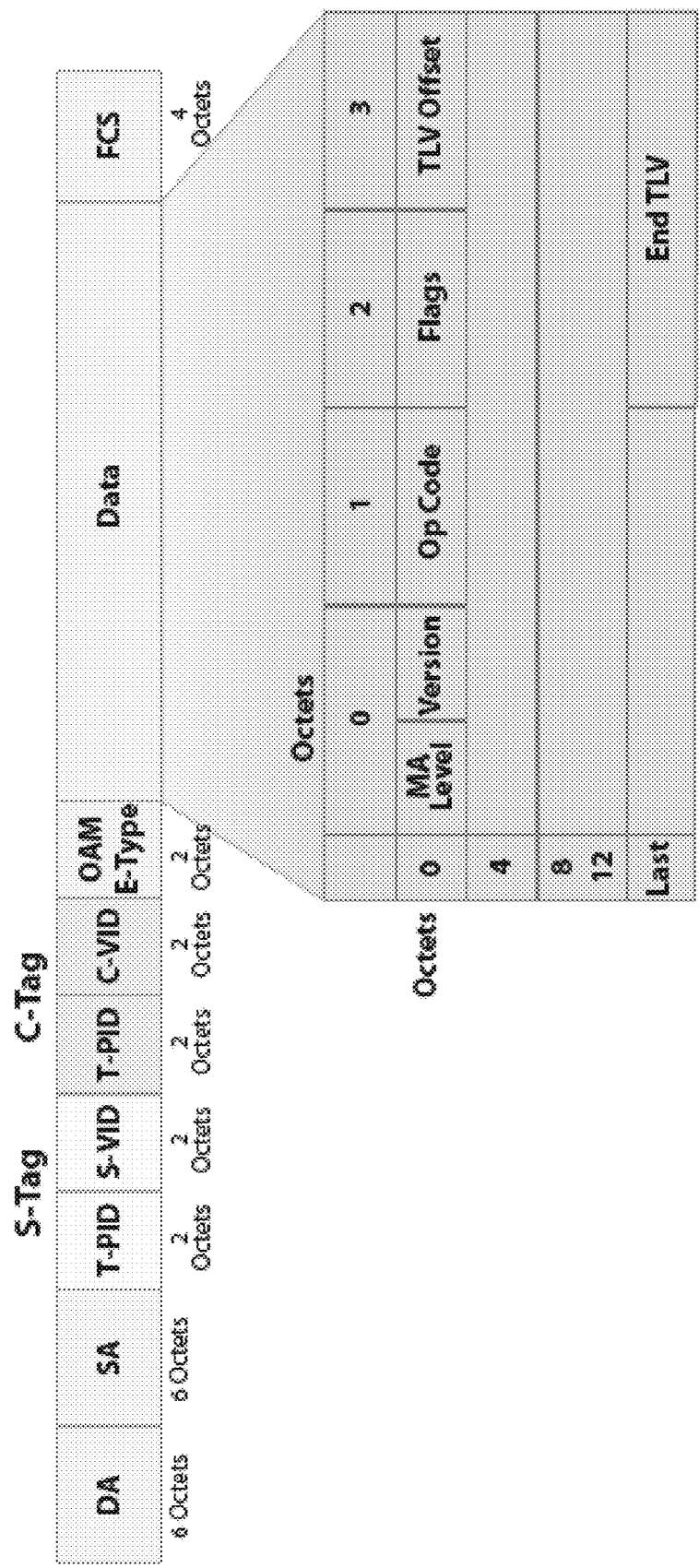
FIG. 6 is a block diagram of an 802.1ag OAM packet.

The 802.1ag CMF message format is shown in FIG. 6. Some CFM messages in accordance with the 802.1ag standard, i.e. LBM messages, employ unicast destination addresses. It is useful to be able to use these CFM messages for diagnostic purposes to check the topology of the link state controlled Ethernet network. In order to do so, proper destination addresses of the nodes in the link state topology are needed. Thus, in accordance with the invention and as shown in FIG. 6, For CFM messages that employ unicast destination addresses, i.e. LBM an LBR messages, the nodal MAC address derived from the Sys-ID of destination node is used (e.g. FIG. 7, 400, 402, 404). This node level MAC address is installed in the FIB at the time of link state protocol exchanges.

Some CFM messages, such as mLBM and CCM, employ unique broadcast destination addresses. These addresses are incompatible with the link state Ethernet protocol, in that RPFC will break and loops will result. So, at the infrastructure level, these messages are not used.

Figure 7:
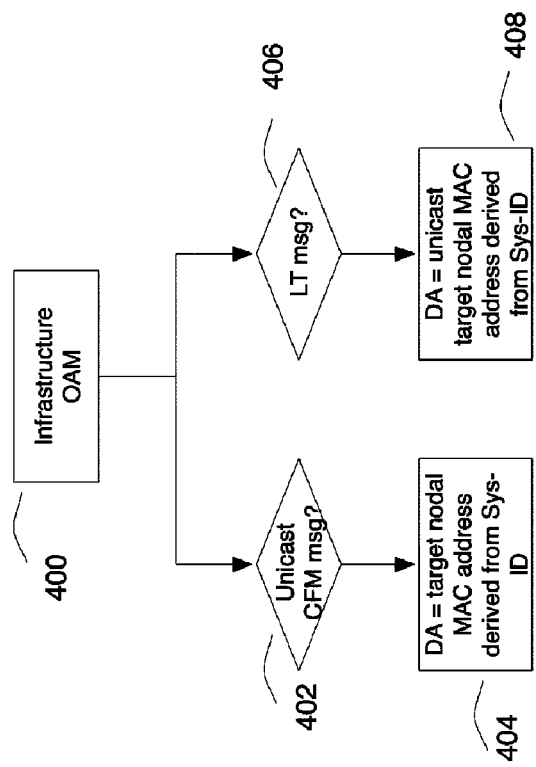
FIG. 7 is a flow diagram of the processing of infrastructure level OAM packets at a node of a link state protocol controlled Ethernet network according to an embodiment of the invention.

In further accordance with the invention, a change is made to the manner in which LTM CFM messages are addressed at the infrastructure level. According to the standard, the LTM message employs a well-known group multicast MAC address. However, in a link state controlled Ethernet network, there are no multicast entries in any node FIB until the $1^{st}$ I-SID has been established. So, a standard LTM message received by a link state controlled Ethernet network node at this stage would be dropped. Therefore, the invention provides for a modification to the standard implementation. The LTM message in accordance with the invention employs a unicast destination address for the target destination node (FIG. 7 400, 406, 408). Again, the destination address employed is the nodal MAC address derived from the Sys-ID of the target destination node. Since the link state controlled Ethernet network is pre-configured rather than "flood and learn", the path to the destination is known, so a unicast LTM message can follow the preconfigured path to the target node.

Figure 8:
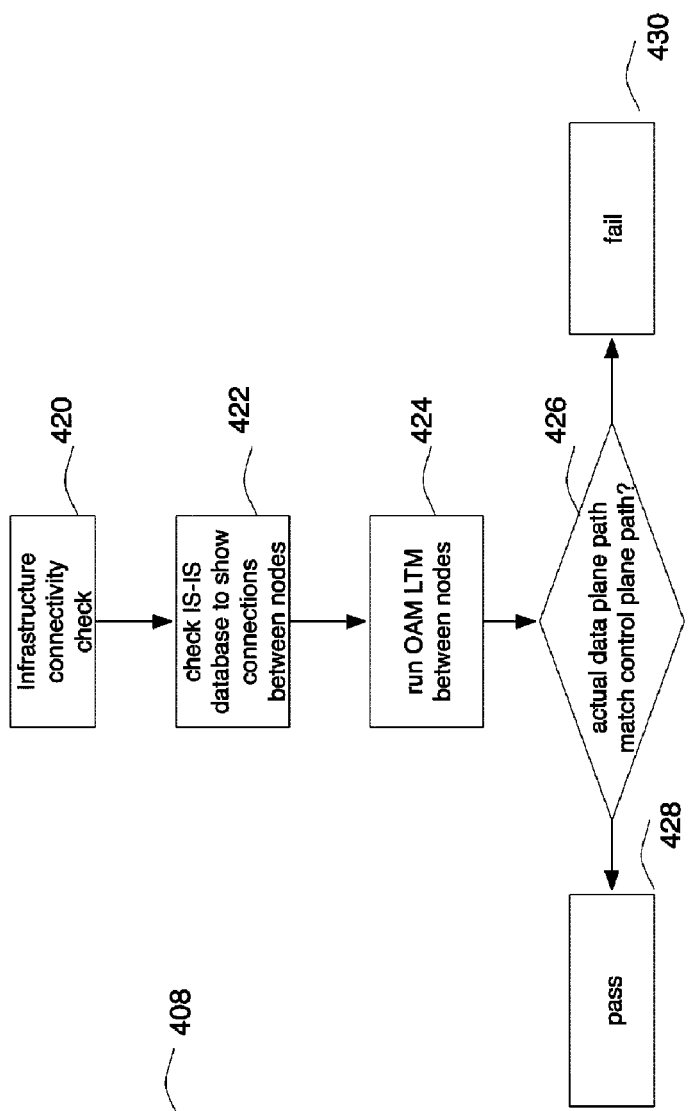
FIG. 8 is a flow diagram of an infrastructure level continuity check process performed at a node of a link state protocol controlled Ethernet network according to an embodiment of the invention.

Referring now to FIG. 8, the use of link state protocol controlled Ethernet with OAM provides an opportunity for double checking connectivity at the infrastructure level. For a given node or nodes in the link state controlled Ethernet network, an operator can check the link state database itself to see what connections were generated by the link state protocol. (420, 422) And, an operator can run a linktrace from the node or between pairs of nodes (424) to check to see if the LTM and LTR messages show that the actual paths that exist between nodes match the paths that the link state protocol initially set up as reflected by the FIB (426-430).

Service Level OAM

Link state protocol controlled Ethernet can also implement CFM at the service level, after the I-SIDs are set up. Ethernet OAM is designed to operate at the I-SID level, and thus the 802.1ag and Y.1733 standards can be used and enhanced to provide service level OAM functionality for link state protocol controlled Ethernet.

mLT

Figure 9:
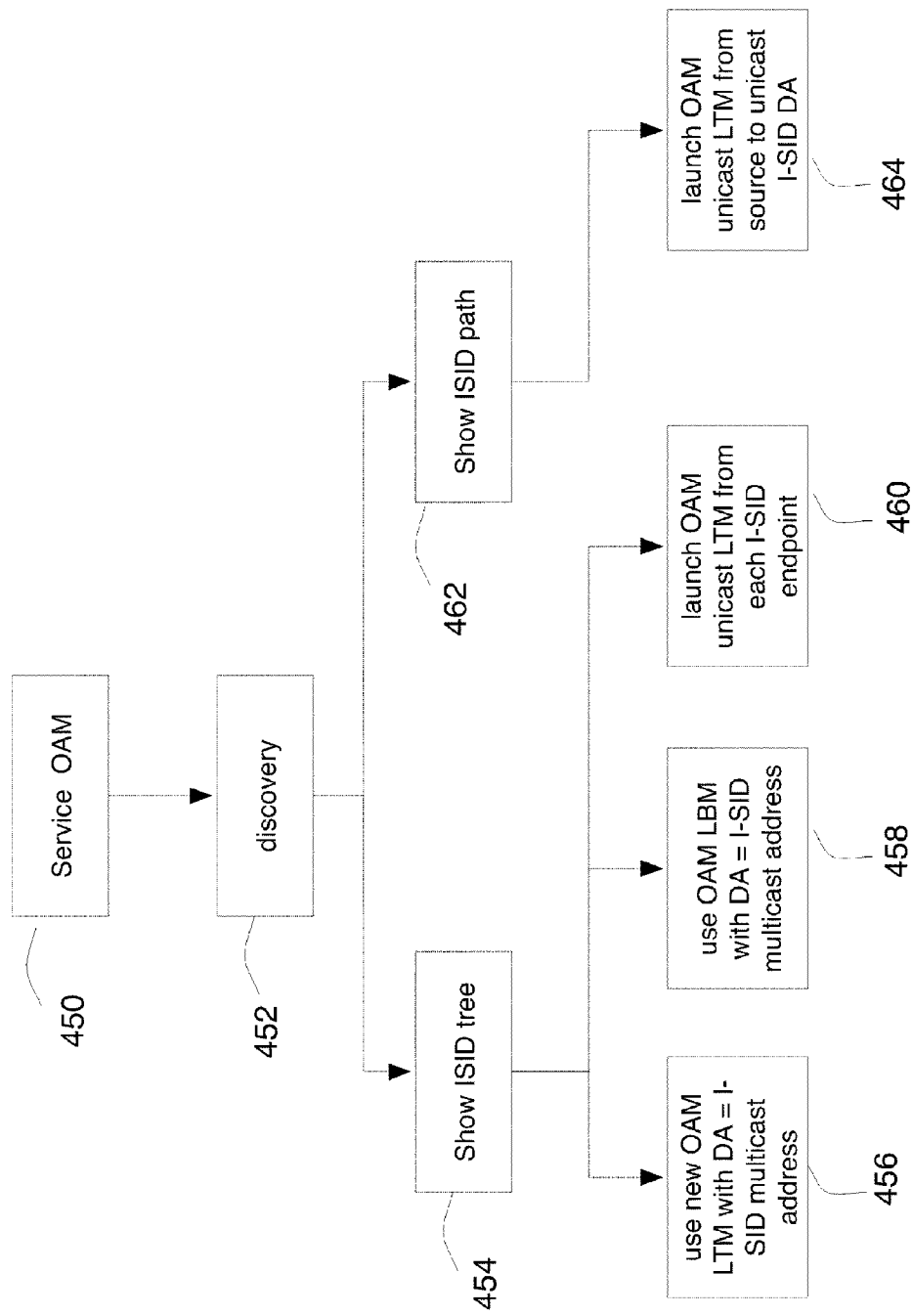
FIG. 9 is a flow diagram of the processing of service level OAM packets at a node of a link state protocol controlled Ethernet network according to an embodiment of the invention.

In a classic flood and reverse path learning Ethernet network, all I-SIDs follow the same multicast distribution path rooted at a single multicast source address. But in the link state protocol controlled Ethernet network, each service instance, i.e. ISID, roots a multicast distribution path. So, if one wants to troubleshoot a service instance path in a link state protocol controlled Ethernet network, then instead of using a unicast LTM or a standards based multicast LTM that is incongruent with the ISID path, it makes sense to use a new alternative. In accordance with one aspect of the invention, a new OAM link trace message is therefore provided at the service level. This link trace message, instead of using a multicast standard Ethernet DA of FIG. 6, uses as its DA an I-SID multicast address (FIG. 9 456). By using the ISID multicast DA, the linktrace will follow the optimized multicast path rooted from the node for which the trace is launched, rather than from the classic Ethernet multicast tree.

Discovery

Service level OAM can be used for discovery purposes to validate the topology of the link state protocol controlled Ethernet network. For example, referring to FIG. 9, a "show ISID tree" command can be launched from a node to which the ISID is attached (454). According to one option, an mLBM command (wildcard ping) can be launched from the ISID node, using the ISID mDA—not the CFM mDA of the 802.1ag standard (458). Or, for each ISID end-point, a unicast LTM (traceroute) can be launched within the ISID (460). According to an alternate option, the previously described mLTM (wildcard traceroute) command can be launched from the ISID node, which will trace the path of the multicast ISID tree (456).

Figure 10:
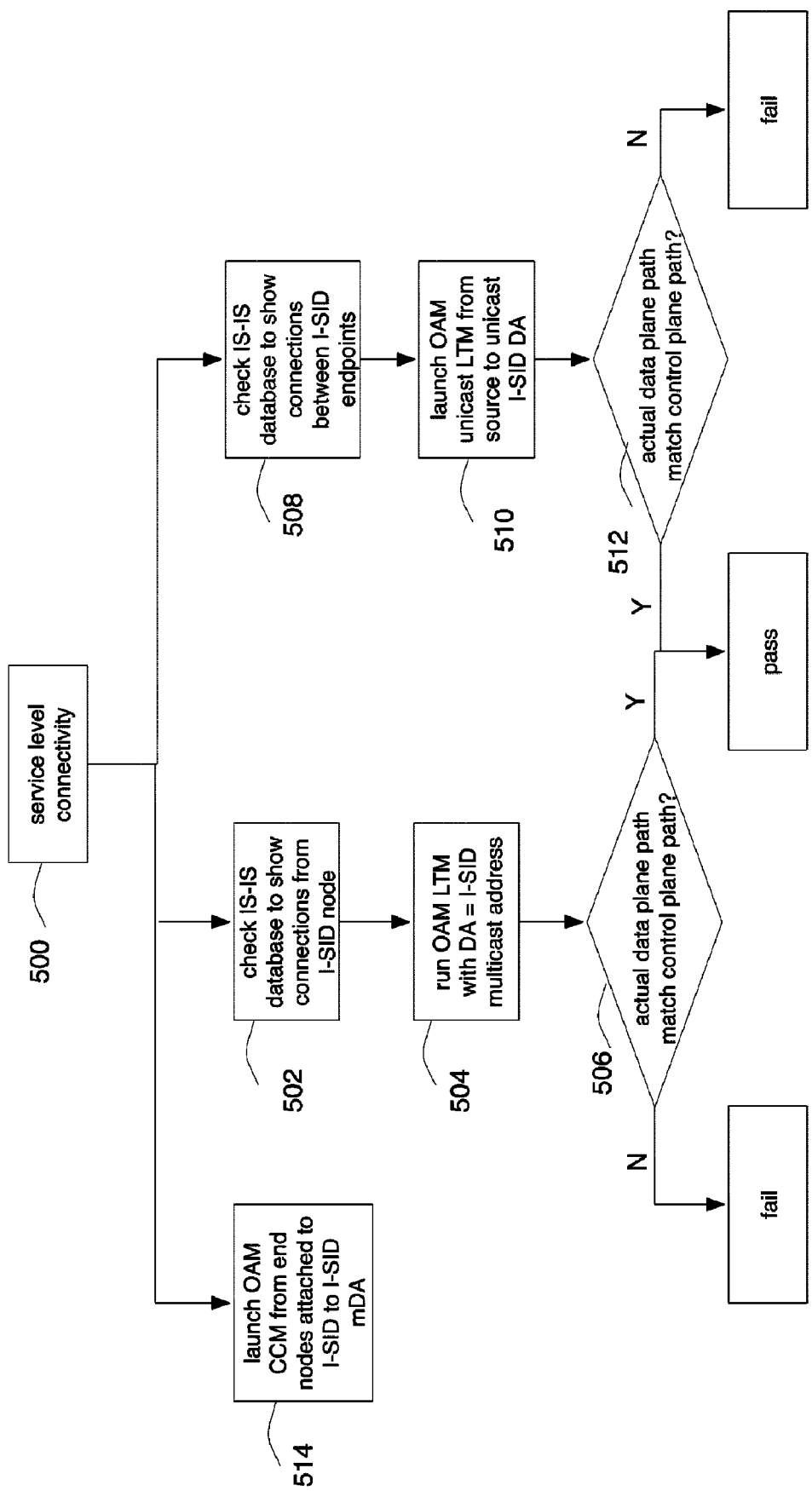
FIG. 10 is a flow diagram of an service level continuity check process performed at a node of a link state protocol controlled Ethernet network according to an embodiment of the invention.

Note that the link state protocol has populated all the nodes in the network with their view of the network topology. So, for example, as shown in FIG. 10 steps 500-506, where the link state database is an IS-IS database, one can query the IS-IS database for all the end nodes attached to a given ISID. Then, the service level OAM linktrace described above can be run through the dataplane to see if the dataplane topology is in fact arranged as the control plane indicates it should be.

Discovery can also be used to validate paths in the network. A "show ISID path" command (FIG. 9 462) can verify a path between endpoints. For example, to show a path on an ISID 101 between nodes A and B, one would launch an LTM (traceroute) from node A on the ISID 101 to the node B (464). Again, the LTM DA is the unicast DA of the sys-ID (node B) of the destination node—not the standards based CFM DA.

Connectivity

Again, the link state protocol has populated all the nodes in the network with their view of the network topology. So, for example, as shown in FIG. 10 steps 508-512, where the link state database is an IS-IS database, one can query from any node in the IS-IS database for the I-SID path between node A and node B. Or, one can query from and endnode on I-SID for the path to the other endnode—for example, query from endnode A to show the path to endnode B. Then, the service level OAM linktrace described above can be run through the dataplane to see if the dataplane topology is in fact arranged as the control plane indicates it should be.

Service OAM can also be used for connectivity verification and fault detection, between I-SID endpoints and within an I-SID. An OAM message equivalent to a CFM CCM can be issued from end nodes attached to I-SIDs as a connectivity check mechanism (FIG. 10, 514). Again, these CCM messages will be addressed based on I-SID mDA (i.e. resolved to Sys-IDs), as opposed to CFM-DA. Further, these CCM messages can be issued at every service level. IP subnet level CCM messages are resolved directly to Sys-IDs, while IP-VPN, VRF, etc, are resolved via I-SIDs.

MEP/MIP Automatic Generation

In accordance with aspects of the invention, the link state protocol controlled Ethernet network allows automatic generation of MEPs and MIPs.

Figure 12:
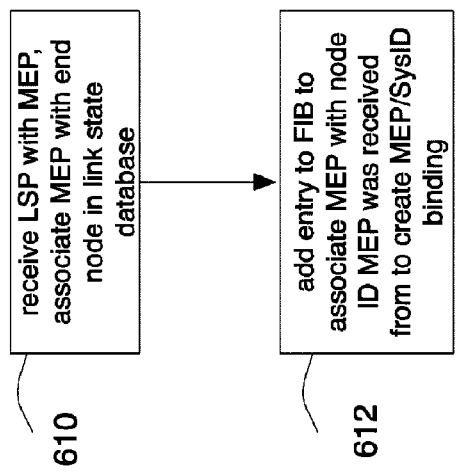
FIG. 12 is a flow diagram of MEP reception and forwarding table updates in a node in a link state protocol controlled Ethernet network according to an embodiment of the invention.
Figure 11:
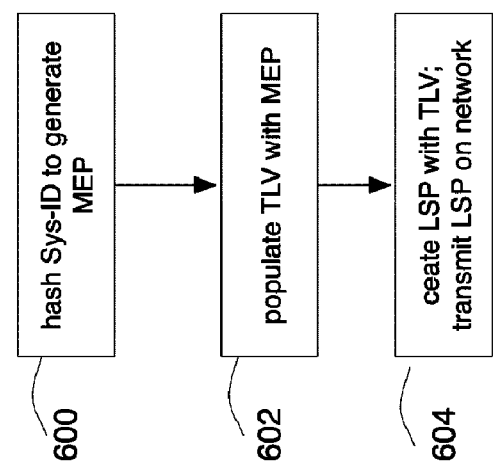
FIG. 11 is a flow diagram of MEP creation and distribution by a node in a link state protocol controlled Ethernet network according to an embodiment of the invention.

As part of link trace protocol discovery, each node in the link state protocol controlled Ethernet network automatically instantiates default MD level 802.1ag logic, but may do so using Sys-ID names translated to MAC addresses. In accordance with the invention, as shown in FIG. 11, at the infrastructure level, each node may hash its Sys-ID to derive its MEP and/or MIP (600), and then populate a TLV with this information (602). The TLV is then transmitted in a Link State PDU (LSP) onto the network (604). In FIG. 12, it shows when a node receives such an LSA (610), it associates the received MEP information in the TLV with the end node from which the LSA was received. The receiving node adds an entry to its FIB to associate the MEP with the nodal MAC of the node the LSA was received from to create a MEP/Sys-ID binding. Thus each node then knows what the MIP and MEP points are for every other node in the network.

Figure 13:
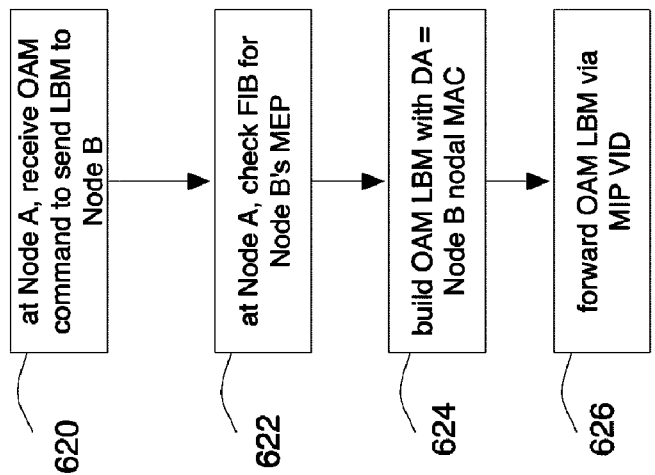
FIG. 13 is a flow diagram of MEP of a process of using MEP lookup to sending an OAM command from node A to node B according to an embodiment of the invention.

Thus, an operator can execute an infrastructure level OAM command from the perspective of a particular node. For example, as shown in FIG. 13 steps 620-626, an operator chooses to perform a continuity check between nodes A and B. So, from node A, the operator executes an Ethernet OAM LBM—i.e. "ping" command. In accordance with the invention, Node A checks its link state database for Node B's MEP—previously populated during link state configuration. Once this is known, an LBM message with a destination address of Node B is built. Node A's FIB indicates that the LBM message should be sent to the next hop MIP (if indeed there is a node between A and B), on its way node B.

As was shown in FIG. 5, different maintenance domains are associated with different MEP and MIP MD levels. Thus, at the service level, different sets of MEPs and MIPs are specified. The link state protocol controlled Ethernet network allows for dynamic auto configuration of MEPs and MIPs as needed at various service levels. At the infrastructure level, port MEPs for monitoring links are instantiated at a "default" MAID level as set forth in the 802.1ag standard with MD level 0, and are always on. The various service levels can also have always-on MEPs for carrying messages such as CCM. These MEPs are created with MAIDs as a function of the service level identifier I-SID, and the MD level appropriate to the domain. MIPs can be created as always on during link state protocol discovery, with the MD level appropriate to the domain.

IP OAM in Link State Protocol Ethernet Networks

As previously described, IP addresses can map directly to MAC addresses used in forwarding in link state protocol Ethernet networks, as described in co-pending U.S. patent application Ser. No. 12/151,684, filed May 5, 2008, which is entitled IP FORWARDING ACROSS A LINK STATE PROTOCOL CONTROLLED ETHERNET NETWORK, herein incorporated by reference in its entirety. As explained therein, when a node in a link state protocol controlled Ethernet network learns an IP address, it will insert the IP address into its link state advertisement to advertise reachability of the IP address to the other nodes on the network. Each node will add this LSP with the IP addresses it is announcing to its link state database. If a packet arrives at an ingress node, the ingress node will read the IP address, determine which node on the link state protocol controlled Ethernet network is aware of the IP address, and construct a MAC header to forward the packet to the correct node. The DA/VID of the MAC header is the nodal MAC—e.g. this may be the Sys-ID—of the node that advertised the IP address.

Since IP subnets can be mapped congruently to the link state protocol controlled Ethernet network, the automatic creation of MEPs and MIPs and enhanced OAM for link state protocol controlled Ethernet enable OAM functions for IP, such as Ping and Traceroute capability based on Ethernet OAM.

Figure 14:
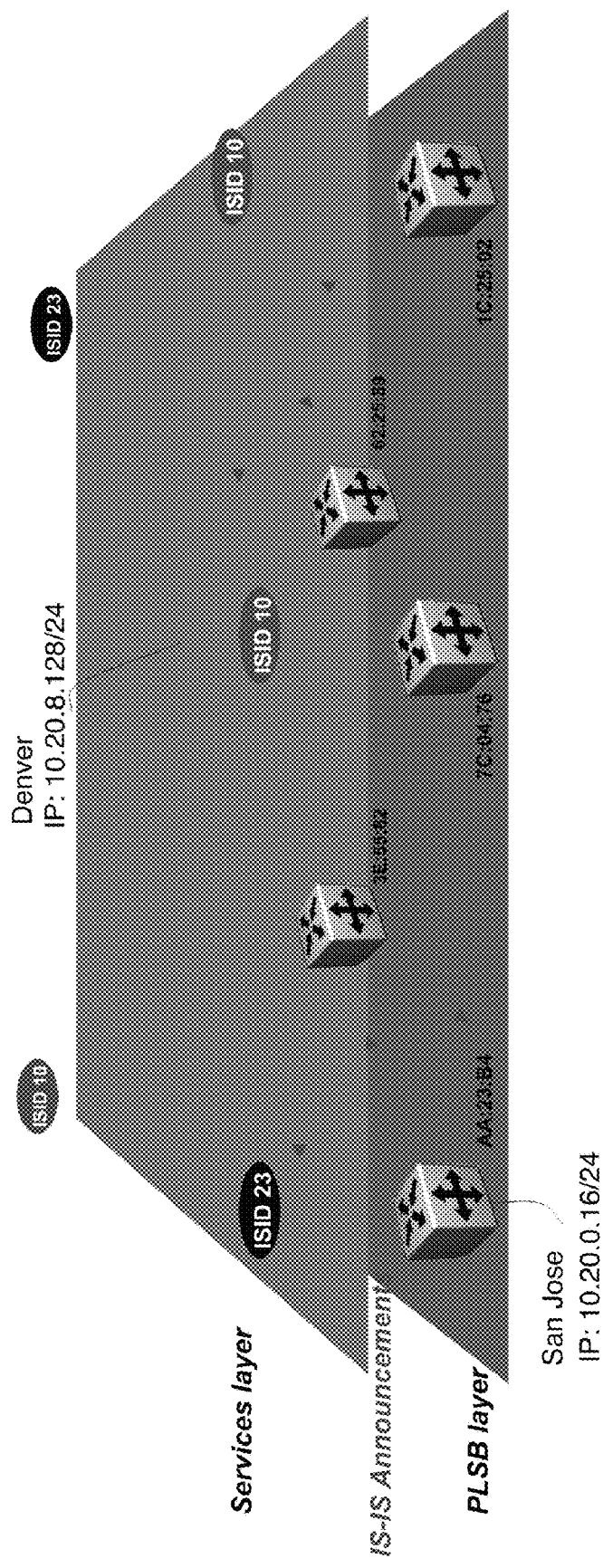
FIG. 14 is a schematic diagram of an IP "Ping" command executed between two IP nodes on a link state protocol controlled Ethernet network.
Figure 15:
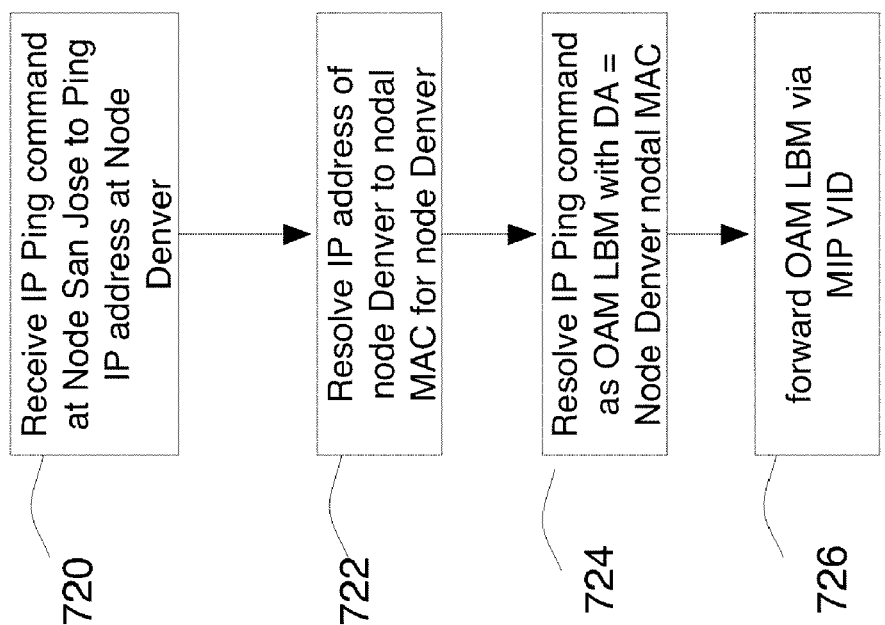
FIG. 15 is a flow diagram of the processing of an IP level "Ping" command at a node in a link state protocol controlled Ethernet network according to an embodiment of the invention.

For example, referring to FIG. 14 the link state protocol controlled Ethernet network is again shown, wherein the MEPs and MIPs have been automatically configured as previously described. The node with Sys-ID San Jose is shown having an IP address 10.20.0.16/24. The node with Sys-ID Denver is shown having an IP address 10.20.8.128/24. Referring to FIG. 15, An operator at the node San Jose enters an IP command "Ping 10.20.8.128" (720). (Or, there may be an equivalent IP name resolved via DNS or some other means of IP to name conversion.) The node at San Jose had previously received an LSA from Denver announcing that 10.20.8.128 was attached thereto, so San Jose's database resolves the destination IP address to the MAC of Denver (722). The IP ping command is resolved as an Ethernet OAM LBM command with Destination Denver (724). The San Jose node checks its FIB to find the MEP for Denver. An LBM is sent to DA Denver, VID MIP (726). Assuming infrastructure continuity between Denver and San Jose, the LBR is returned to San Jose.

Figure 16:
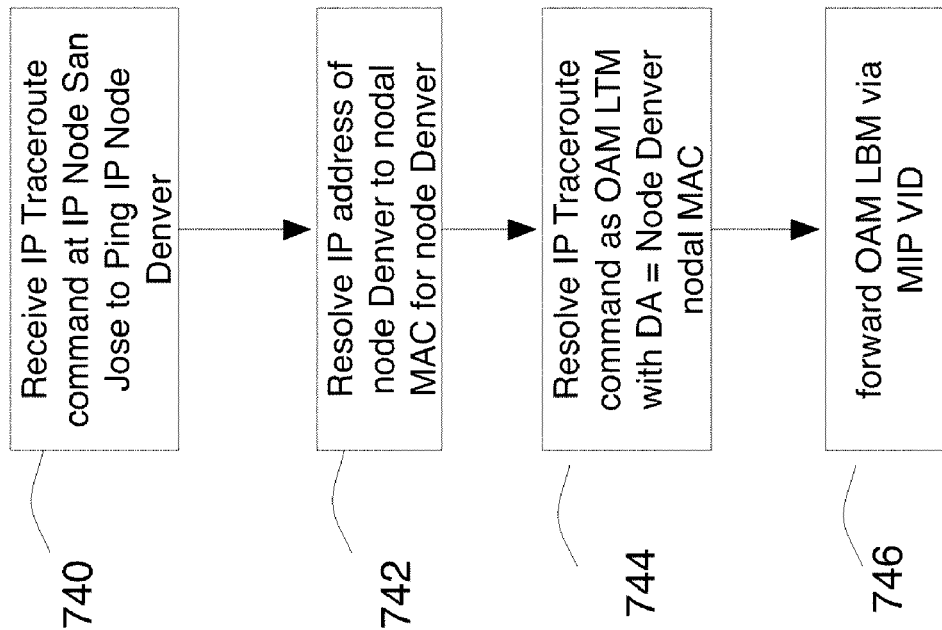
FIG. 16 is a flow diagram of the processing of an IP level "Traceroute" command at a node in a link state protocol controlled Ethernet network according to an embodiment of the invention.

Similarly, referring to FIG. 16, an operator at the node San Jose can enter an IP command "Traceroute 10.20.8.128" (740). (Again, there may be an equivalent IP name resolution.) The node at San Jose had previously received an LSA from Denver announcing that 10.20.8.128 was attached thereto, so San Jose's database resolves the destination IP address to the MAC of Denver (742). The IP traceroute command is resolved as an Ethernet OAM LT command with Destination Denver (744). The San Jose node checks its FIB to find the MEP for Denver. An LTM is sent to DA Denver, VID MIP (746).

Performance Monitoring

The 802.1ag standard has been extended to include performance monitoring metrics and messages. This standard is reflected at ITU-T SG 13, Y.1731—Requirements for OAM in Ethernet Networks, herein incorporated by reference. The following performance parameters are measured by appropriate OAM messages:

1) Frame Loss Ratio (FLR)—FLR is defined as a ratio, expressed as a percentage, of the number of service frames not delivered divided by the total number of service frames during time interval T, where the number of service frames not delivered is the difference between the number of service frames sent to an ingress UNI and the number of service frames received at an egress UNI. Two types of FLR measurement are possible, Dual-ended LM (loss measurement) and Single-ended LM. Dual-ended LM is accomplished by exchanging CCM OAM frames that include appropriate counts of frames transmitted and frames received. These counts do not include OAM frames at the MEPs ME Level. Dual-ended LM enables the proactive measurement of both Near End and Far End FLR at each end of a MEG. Single-ended LM is accomplished by the on-demand exchange of LMM and LMR OAM frames. These frames include appropriate counts of frames transmitted and received. Single-ended LM only provides Near End and Far End FLR at the end that initiated the LM Request.

2) Frame Delay (FD)—FD is specified as round trip delay for a frame, where FD is defined as the time elapsed since the start of transmission of the first bit of the frame by a source node until the reception of the last bit of the loop backed frame by the same source node, when the loopback is performed at the frame's destination node.

3) Frame Delay Variation (FDV)—FDV is a measure of the variations in the FD between a pair of service frames, where the service frames belong to the same CoS (class of service) instance on a point-to-point ethernet connection.

Note again that IP subnets in many cases map congruently to the link state protocol controlled Ethernet network. Now, the automatic creation of MEPs and MIPs and enhanced OAM and performance monitoring for link state protocol controlled Ethernet enable fine grained, detailed "SONET-style" OAM for IP over Ethernet that has heretofore not been available.

Figure 18:
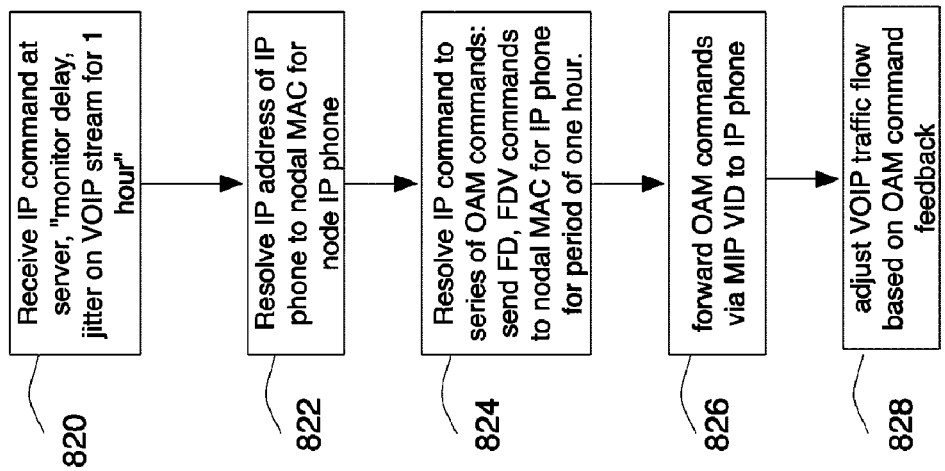
FIG. 18 is a flow diagram of the processing of an IP level performance monitoring command at a node in a link state protocol controlled Ethernet network according to an embodiment of the invention.
Figure 17:
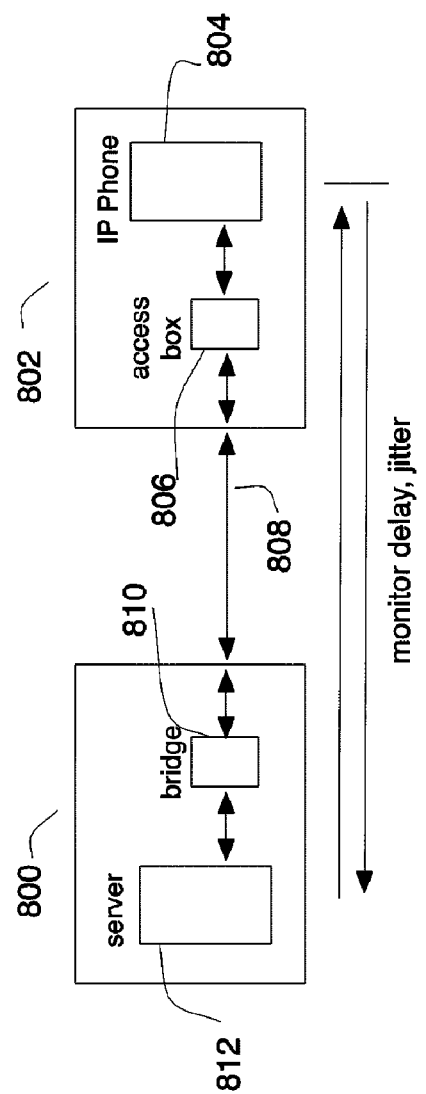
FIG. 17 is a block diagram of a network wherein a provider is coupled to a customer premise having an IP phone, and all communications occur over a link state protocol controlled Ethernet network. Performance monitoring of the VOIP network occurs at the IP level using Ethernet OAM commands in accordance with the invention.

Referring to FIG. 17, there is shown one of many applications wherein Ethernet performance OAM is valuable in an IP application. Shown is a provider 800 and a customer premise 802. The customer has an IP phone 804 coupled via an access box 806 to the provider 800 via link state protocol controlled Ethernet network 808. Within the provider 800 there may be various bridges 810 coupling the network 808 to a server 812 that serves VOIP services to the access box 806 and thus to the IP phone 804. All the devices in FIG. 18 are IP devices. The IP phone, Server, and bridges, along with other bridges and devices not shown, make up the link state protocol controlled Ethernet network. As such, they each have associated therewith a Sys-ID. A link state protocol such as IS-IS has built a unicast loop free communications path between all elements in the network. The IP phone and server have established IP communications in accordance with the methods described in co-pending U.S. patent application Ser. No. 12/151,684, filed May 5, 2008, which is entitled IP FORWARDING ACROSS A LINK STATE PROTOCOL CONTROLLED ETHERNET NETWORK, herein incorporated by reference in its entirety. In short, the IP phone IP subnet is learned by the IP phone node and inserted into its link state advertisement to advertise reachability of the IP subnet to the other nodes on the link state protocol controlled Ethernet network. Likewise, the IP subnet of the server is learned by the server node and inserted into its link state advertisement to advertise reachability of its IP subnet to the other nodes on the link state protocol controlled Ethernet network. If a packet arrives at an ingress node, the ingress node will read the IP address, determine which node on the link state protocol controlled Ethernet network is aware of the IP address, and construct a MAC header to forward the packet to the correct node. The DA/VID of the MAC header is the nodal MAC of the node that advertised the IP address. In this case, an IP flow (i.e. VOIP) from the IP phone to the server will resolve to the MAC of the node to which the IP phone is attached. An IP flow from the Server to the IP phone will resolve to the MAC of the node to which the server is attached.

As was described previously with regard to CFM OAM an operator can perform IP level commands such as "ping" and "traceroute" that can be mapped directly to link state Ethernet commands. In further accordance with the invention, IP level performance monitoring functionality is provided based on link state Ethernet OAM commands and feedback.

For example, referring to FIG. 18, it is desirable for the server 812 to monitor delay and jitter for a particular VOIP stream associated with the IP phone 804. In accordance with the invention, this task is enabled by the fact that the VOIP stream is carried over link state protocol controlled Ethernet, and can thus take direct advantage of the OAM functions described herein. For instance, an operator can launch a command from the server node 812 "monitor delay, jitter for IP phone over next hour" (820). The IP level OAM command would be resolved at the server 812 to a series of Ethernet level OAM commands between the server 812 and the IP phone 804. The OAM level commands that will be used in this example are FD and FDV. First, the MAC address for node that has the IP phone attached or the phone itself is resolved by checking the FIB (822). Then the OAM FD and FDV commands can be forwarded from the node attached to the server 812 to the to the node attached to the IP phone 804 the MIP bridge 810 forwarding path specified in the server 812's FIB for the identified time period (826). Performance statistics can thus be collected for the IP flow in a very detailed manner not heretofore available for IP flows on Ethernet networks. The VOIP flow can then be adjusted (828), if needed, based on the resulting feedback from OAM commands.

IP performance monitoring can be implemented in accordance with the invention for many IP technologies, including IP telephony, IP TV/video, mobile IP, data center, etc. Link state protocol controlled Ethernet enables IP performance monitoring and control in order to unite many disparate types and levels of IP domains and devices. The ability to utilize Ethernet OAM performance monitoring directly at the IP level in accordance with the invention enables IP traffic control levels for voice, data, and video that will easily lend to detailed LSAs.

The present invention may be implemented as one or more computer-readable software programs embodied on or in one or more articles of manufacture. The article of manufacture can be, for example, any one or combination of a floppy disk, a hard disk, hard-disk drive, a CD-ROM, a DVD-ROM, a flash memory card, an EEPROM, an EPROM, a PROM, a RAM, a ROM, or a magnetic tape. In general, any standard or proprietary, programming or interpretive language can be used to produce the computer-readable software programs. Examples of such languages include C, C++, Pascal, JAVA, BASIC, Visual Basic, and Visual C++. The software programs may be stored on or in one or more articles of manufacture as source code, object code, interpretive code, or executable code.

Although the invention has been shown and described with reference to specific preferred embodiments, it should be understood by those skilled in the art that various changes in form and detail may be made therein without departing from the spirit and scope of the invention as defined by the following claims.

We claim:

1. A method of network topology verification in a link state protocol controlled Ethernet network comprising the steps of:
   checking a link state protocol database at a node to ascertain a control plane topology view of at least part of the network, the topology view representing connection relationship between the node and other nodes in the network;
   executing one or more Ethernet OAM commands from the node to ascertain a data plane topology view of the same part of the network;
   comparing the control plane topology view of the network to the data plane topology view of the network to see if they match;
   flagging an error if they do not match.

2. The method of claim 1 wherein
   the step of checking the link state protocol database comprises the step of tracing all paths through the network from a first node in the link state protocol controlled Ethernet network;
   and wherein the step of executing one or more Ethernet OAM commands comprises the step of executing one or more link trace Ethernet OAM link trace commands from the first node in order to trace a service instance, the link trace commands using an IEEE 802.1ag format except, as a destination address, using a multicast destination address of the service instance.

3. The method of claim 1 wherein
   the step of checking the link state protocol database comprises the step of tracing a path through the network from a first node to a second node in the link state protocol controlled Ethernet network;
   and wherein the step of executing one or more Ethernet OAM commands comprises the step of executing one or more link trace Ethernet OAM link trace commands from the first node in order to trace a service path, the link trace commands using an IEEE 802.1ag format except, as a destination address, using a unicast destination address of the Ethernet MAC node ID.

4. A program product comprising a non-transitory computer readable medium having embodied therein a computer program for storing data, the computer program performing network topology verification in a link state protocol controlled Ethernet network, the program product comprising: logic for checking a link state protocol database at a node to ascertain a control plane topology view of at least part of the network; logic for executing one or more Ethernet OAM commands from the node to ascertain a data plane topology view of the same part of the network; logic for comparing the control plane topology view of the network to the data plane topology view of the network to see if they match; logic for flagging an error if they do not match.

5. The program product of claim 4 wherein the logic for checking the link state protocol database comprises
   logic for tracing all paths through the network from a first node in the link state protocol controlled Ethernet network;
   and wherein the logic for executing one or more Ethernet OAM commands comprises
   logic for executing one or more link trace Ethernet OAM link trace commands from the first node in order to trace a service instance, the link trace commands using an IEEE 802.1ag format except, as a destination address, using a multicast destination address of the service instance.

6. The program product of claim 4 wherein the logic for checking the link state protocol database comprises
   logic for tracing a path through the network from a first node to a second node in the link state protocol controlled Ethernet network;
   and wherein the logic for executing one or more Ethernet OAM commands comprises logic for executing one or more link trace Ethernet OAM link trace commands from the first node in order to trace a service path, the link trace commands using an IEEE 802.1ag format except, as a destination address, using a unicast destination address of the Ethernet MAC node ID.

* * * * *

UNITED STATES PATENT AND TRADEMARK OFFICE
CERTIFICATE OF CORRECTION

PATENT NO. : 8,264,970 B2  Page 1 of 1
APPLICATION NO. : 12/249946
DATED : September 11, 2012
INVENTOR(S) : Mohan et al.

It is certified that error appears in the above-identified patent and that said Letters Patent is hereby corrected as shown below:

In the Specification:

In column 7, line 30, delete "sendee" and substitute --service--.

In column 7, line 31, delete "sendee" and substitute --service--.

In column 7, line 39, delete "multi-to-point" and substitute --multipoint-to-point--.

Signed and Sealed this
Twenty-fifth Day of December, 2012

David J. Kappos
*Director of the United States Patent and Trademark Office*